Jan. 12, 1960 L. R. TOOTHMAN ET AL 2,921,107
CONTROL SYSTEM FOR ARC FURNACE
Filed July 1, 1958 2 Sheets-Sheet 1

INVENTORS.
Peter G. Kurch
Lawrence R. Toothman
BY
Lee H. Kaiser
Attorney

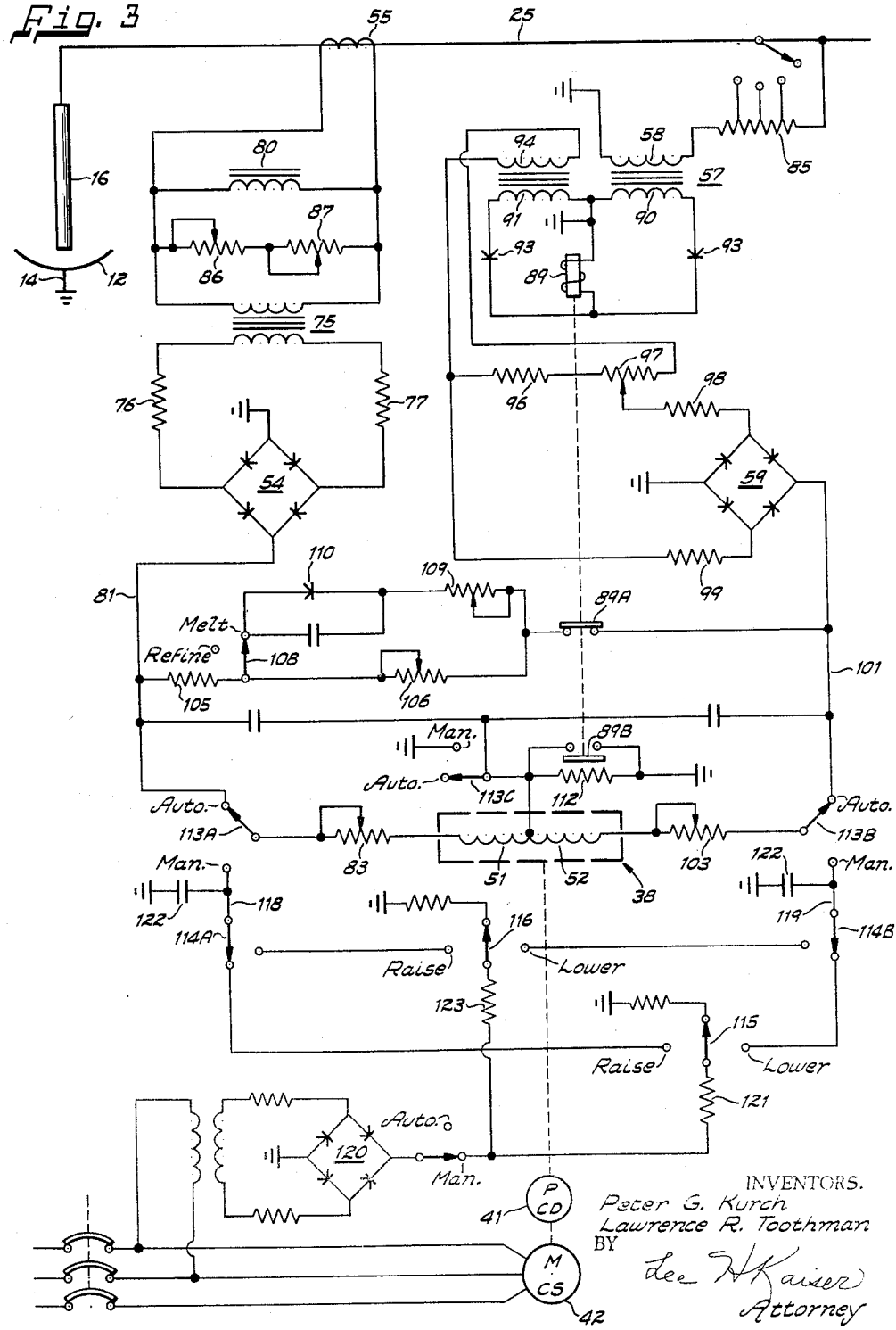

United States Patent Office 2,921,107
Patented Jan. 12, 1960

2,921,107

CONTROL SYSTEM FOR ARC FURNACE

Lawrence R. Toothman, Houston, Pa., and Peter G. Kurch, Sanford, Fla., assignors to McGraw-Edison Company, Milwaukee, Wis., a corporation of Delaware Application July 1, 1958, Serial No. 760,050

17 Claims. (Cl. 13—13)

This invention relates to furnace control systems and more particularly to control systems for raising, lowering, and adjusting the electrodes of an electric arc furnace.

An object of the invention is to provide an arc furnace regulating system having means for accelerating the speed of electrode movement under predetermined conditions of the arc.

The charge in an electric furnace during melting may have an irregular and uneven surface facing the electrodes which may progressively become altered as melting occurs, thereby requiring the electrodes to be independently and continuously adjusted for the maintenance of optimum arcing conditions. As melting proceeds the arc from each electrode may melt a cavity through the charge, and the electrode must follow the receding metal which melts down very rapidly. Often the electrodes pass through the charge and arc to the molten pool on the furnace hearth, and the heat beneath the remainder of the charge may cave in the charge against one or more of the electrodes, thereby causing substantially short circuits and necessitating rapid adjusting movements of the electrodes.

It is a further object of the invention to provide a control system for an electric arc furnace having electrically controlled fluid means for positioning the electrodes in response to arc voltage and arc current and novel means for varying the sensitivity of the electric control means under predetermined arcing conditions.

In an effort to maintain optimum arcing distance for each electrode, difficulty has heretofore been experienced in providing control mechanism which is instantaneously responsive to changing arcing conditions and which quickly and accurately moves the electrode to reestablish the optimum arcing distance without overshooting as a result of the inertia of the moving parts. In an effort to overcome such "hunting," resort has been had to means for damping the movement which, however, has resulted in sluggishness of response, particularly in furnace control systems using motive power of the traction type. This tendency to "hunt" may be further aggravated by current surges during melt down of the charge which causes rapid withdrawal of the electrode even though no cave in occurs.

Another object of the invention is to provide, in a control system for an electric arc furnace, novel means for preventing hunting of the electrodes during the melting of the charge. Still another object is to provide, in a control system for an electric arc furnace having electrically actuated fluid means for positioning the electrodes, novel means for changing the sensitivity of the control means under predetermined arc conditions which tend to cause hunting of the electrodes.

A still further object of the invention is to provide a control system for an electric arc furnace having electrically controlled valving means for positioning the electrode and including a hydraulic amplifier for multiplying the input to the valving means.

Another object of the invention is to provide a sensitive, durable electric furnace control operable by fluid power which is low in cost, easily maintained, resistant to hunting, and is susceptible to close control.

These and other objects and advantages of the invention will be apparent from the following description when taken in conjunction with the accompanying drawing wherein:

Fig. 3 is a schematic electric circuit diagram of a preferred embodiment of the electric furnace control system of the invention.

Figure 1:
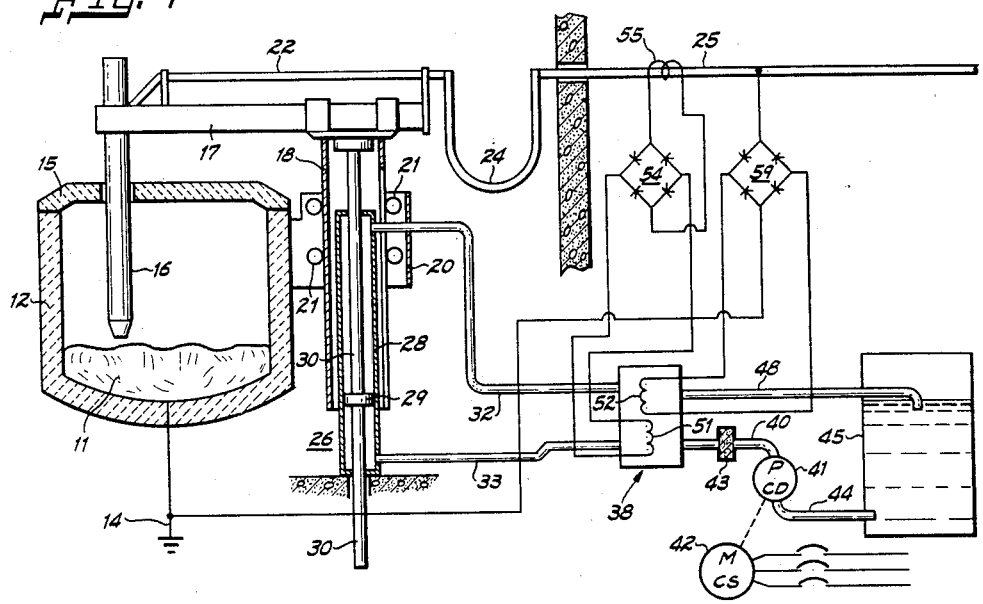
Fig. 1 is a schematic illustration of the relationship between the electrical and mechanical elements of an electric arc furnace embodying the invention.

Referring to the drawing, the control system is shown as applied to the raising and lowering of an electrode in an electric arc furnace with relation to a metal charge 11 contained in a suitable crucible 12. The refractory which lines the hearth includes conductive members which establish a ground connection 14 with the charge 11. The crucible 12 may be provided with a roof 15 having openings for the reception of furnace electrodes, only one of which electrode 16 is shown. Conventionally three electrodes are employed, each having its separate supporting, adjusting, and control equipment, but since the apparatus is duplicated for each electrode, it will be sufficient to describe a single electrode and its associated equipment.

The electrode 16 is connected to a horizontally disposed electrode supporting arm 17 having a vertical extension 18. One end of the supporting arm 17 carries releasable clamping means for the upper end of the electrode 16, and the vertical extension 18 is connected to, and depends from, the other end of the arm 17 and is positioned adjacent the side wall of the furnace shell 12. Vertical extension 18 is preferably tubular and mounted for vertical sliding movement by means of a support bracket 20 supported on the furnace shell 12 and equipped with guide rollers 21. The horizontal support arm 17 is preferably insulated from the vertical extension 18 and carries a bus 22 which is electrically connected to the electrode 16 and to flexible conductors 24 which communicate through a conductor 25 with a suitable power source such as the secondary of a furnace transformer (not shown) for supplying electrical energy to electrode 16. When electrode 16 is adjusted to contact the charge 11, electric current will flow through the charge from electrode 16 and then through the other electrodes of the furnace, causing arcs to be formed under the electrodes as they are slightly withdrawn from contact position.

The vertical extension 18 and the horizontal support arm 17 constitute a vertically movable mounting for the electrode 16, and in order to move the mounting, and thus raise or lower the electrode 16 in the furnace, a fluid servomotor 26 is provided. Although the fluid servomotor 26 may assume a variety of forms, it is herein disclosed as a hydraulic motor of the reciprocatory type having a cylinder 28 with a port opening to each end thereof and a piston 29 reciprocable therein. A piston rod 30 extends in both axial directions from the piston and through the end of the cylinder 28 to assure that there will be no difference in area on opposite sides of the piston 29. The upper end of piston rod 30 is affixed to vertical extension 18 to impart, with movement of piston 29, movement of the mounting for electrode 16 and a feeding of the electrode 16 toward the melt or a withdrawal of the electrode from the melt. A counterweight may be provided to counterbalance the weight of the electrode 16 and the vertically movable mounting for electrode 16, or these hydraulically supported parts may be counterbalanced by the use of back pressure on the hydraulic medium in conventional manner. In order to assure high dynamic response and close control, the hydraulic actuating system is preferably of the "positive" type as shown with fluid under pressure against the piston 29 during both the up and down movements of the electrode rather than of the type wherein the force of gravity is utilized to lower the electrode. Further the servovalve 38 is positioned as close to the servomotor 26 as possible to assure minimum backlash due to changes in fluid viscosity or expansion of the conduit tubing.

Conduits 32 and 33 registering with the cylinder 28 at the upper and lower ends thereof are connected to "delivery" passages 36 and 37 of a four-way hydraulic valve 38 which controls the position of piston 29 within cylinder 28. Fluid under pressure for operating piston 29 is supplied to the "inlet," or "pressure," passage 39 of valve 38 through conduit 40 from a suitable pump 41, preferably of the constant volume type driven by a three phase unidirectional electric motor 42. A suitable filter 43 is inserted in conduit 40 adjacent valve 38 and input side of pump 41 is connected to a feed pipe 44 which leads to a reservoir 45 containing a suitable fluid, preferably a hydraulic liquid. The "drain" passage 47 of valve 38 is connected to reservoir 45 by a feed pipe 48.

As explained in detail hereinafter, the servovalve 38 includes a hydraulic amplifier having an actuating motor, or polarized solenoid 50 energized from two differentially wound coils 51 and 52 for selectively controlling the direction of energy delivery from valve 38, and the electrical input signals to coils 51 and 52 of valve 38 are proportional to arc current and arc voltage respectively. As schematically illustrated in Fig. 1, "raise" coil 51 is energized from the direct current output voltage of a copper oxide full wave rectifier 54 coupled to the secondary of a current transformer 55 connected in the conductor 25 leading to the electrode 16. Consequently, "raise" coil 51 is energized in proportion to the current in electrode 16. An isolating transformer 57 has its primary winding 58 connected to conductor 25 as close to electrode 16 as possible and also to the ground connection 14, thus placing the primary winding 58 in shunt connection across an arc formed between the electrode 16 and the charge 11. The output from the secondary of transformer 57 is applied across a full wave copper oxide rectifier 59, and the rectified control signal energizes "lower" coil 52 of valve 38. The coil 52 is thus energized in proportion to the voltage across the arc.

Figure 2:
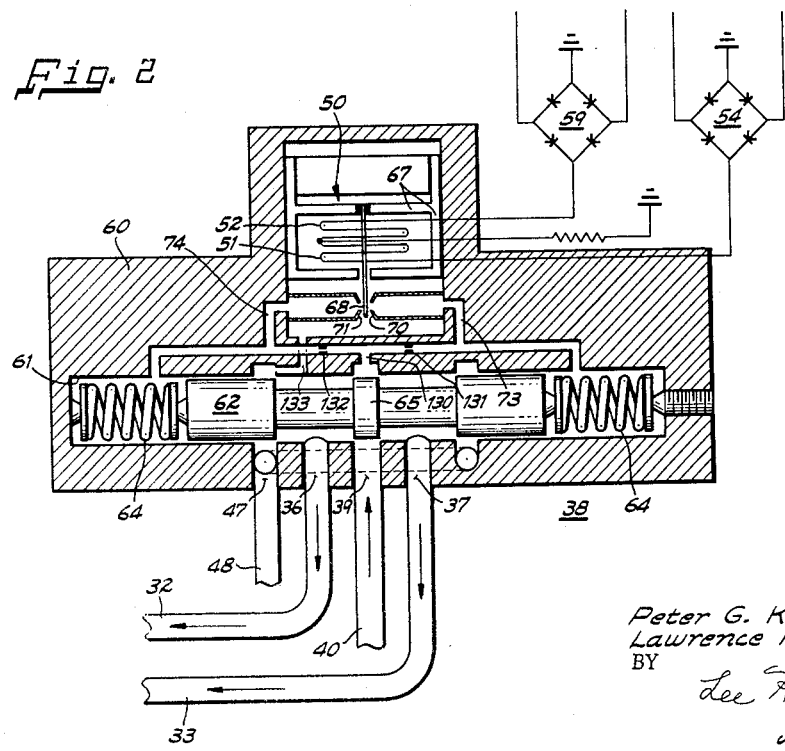
Fig. 2 shows the valve means of the control system of the invention.

Valve 38 is preferably an electrically actuated, four-way hydraulic valve featuring high dynamic response and sensitivity together with small size and low weight. Valve 38 has a body portion 60, preferably of aluminum alloy, provided with a tubular cylindrical bore 61 in which a piston valve 62 slidably reciprocates. Piston valve 62 is normally maintained, by springs 64 compressed between opposite sides of valve 62 and the end walls of valving cylinder 61, in a neutral position wherein the larger diameter central portion 65 of valve piston 62 obstructs "inlet" passage 39 and prevents fluid under pressure from pump 41 from entering either outlet passage 36 or 37. When piston valve 62 is actuated to the right as shown in Fig. 2, fluid under pressure from inlet passage 39 can enter delivery passage 36 but is obstructed by central portion 65 from entering delivery passage 37; similarly fluid enters passage 37 when piston valve 62 is actuated to the left. A hydraulic amplifier adapted to multiply the forces available for actuating piston valve 62 includes the magnetic pole structure 67 of the electromagnetic actuating motor, or polarized solenoid 50. The differentially wound coils 51 and 52 surround the pivoted armature 68 of actuating motor 50, and a flapper on the free end of armature 68 is actuated between two nozzles 70 and 71 of the hydraulic amplifier, thus creating a pressure differential proportional to the difference in signals energizing the coils 51 and 52. The nozzles 70 and 71 are connected respectively by control passages 73 and 74 which register with the valve cylinder 61 adjacent opposite ends thereof, and the differential hydraulic pressure output from control passages 73 and 74 is applied to the ends of the piston valve 62 in opposition to the two return springs 64 to position the piston valve 62. Fluid under pressure from pump 41 and passage 39 circumvents piston valve 62 and enters an input port 130 to the hydraulic amplifier. From port 130 the fluid flows to the right and left through restricted orifices 131 and 132 into the control passages 73 and 74 respectively and thence through the nozzles 70 and 71. Fluid discharged from nozzles 70 and 71 exits through opening 133 and drain passage 47. The flapper on armature 68 is actuated by polarized solenoid 50 between the two nozzles 70 and 71, thus creating a pressure differential proportional to the difference in signals energizing coils 51 and 52. For example, when armature 68 is against nozzle 70, the fluid can discharge more easily from nozzle 71, the pressure drops in control passage 74, and piston valve 62 moves to the left. This construction results in exceptionally high forces for driving piston valve 62 and permits the supply of up to 50 gallons per minute to servomotor 26 with a differential input current of only eight milliamperes. Such electrically actuated four-way valve is commercially available from the Moog Valve Company, Inc. The large volume output available from servovalve 38 provides substantially instantaneous response of the electrode 16 and accurate and close contact thereof.

Referring now to the schematic circuit diagram of the furnace control system shown in Fig. 3, the output of the current transformer 55 is impressed across the primary of a voltage amplification transformer 75 preferably having a 1-to-4 turn ratio, and the secondary of transformer 75 is connected in series with peak current limiting resistors 76 and 77 across full wave bridge rectifier 54. Preferably copper oxide rectifiers which have no "forming" period are used to assure instantaneous D.C. response. A saturable reactor 80 connected across current transformer 55 by-passes excessive current surges and prevents the development of excessive voltage across the control components. This reactor 80 saturates in the event of heavy current surges such as are commonly encountered at the beginning of furnace operation when the arc is initiated and broken rapidly before the furnace current reaches a steady state. One direct current terminal of rectifier 54 is grounded and the other direct current terminal is connected through conductor 81, a movable switch pole 113A, and a resistance 83 to the "raise" coil 51 of the hydraulic amplifier. A variable voltage adjusting resistor 86 which establishes maximum load conditions in the furnace is connected in series with a load adjusting rheostat 87, and this serial arrangement is connected across the primary of multiplication transformer 75. Load rheostat 87 is manually varied when it is desired to adjust the magnitude of the current in electrode 16, and rheostat 87 presents a constant load to the control circuit through the desired range of furnace transformer output. In certain embodiments load adjusting rheostat 87 is provided with taps, and relays (not shown) actuated simultaneously with furnace transformer tap changes short circuit between the taps and one end of the rheostat to thus present a constant load to the control circuit.

The primary of isolating transformer 57 is connected to conductor 25 through a tap resistor switch 85 which permits a constant voltage to be supplied to the control system regardless of the furnace transformer tap setting. When a tap change is made in the furnace transformer supplying energy to the electrode 16, it is necessary to adjust the value of the voltage supplied by isolating transformer 57 so that the voltage actually applied to the rectifier 59 remains unchanged. This is accomplished by correspondingly changing taps on tap resistor switch 85, and if desired, the movable contact of tap switch 85 may be mechanically connected to the tap changer of the transformer so that a change in furnace transformer voltage results in a corresponding opposite change in the tap resistor 85 and the voltage applied to the rectifier 59 remains unchanged. In certain embodiments of the invention relays (not shown) actuated when a furnace transformer tap change is made, short circuit portions of the tap resistor 85 to provide constant voltage at rectifier 59.

A normally operated emergency raise relay 89 energized from isolating transformer 57 is adapted to change the sensitivity of valve 38 as explained hereinafter and thus increase the speed at which electrode 16 is raised when the charge 11 caves in against the electrode 16 and causes the arc voltage to fall below a predetermined value. Direct current relay 89 is connected to the junction of two secondary windings 90 and 91 of isolating transformer 57, and half-wave rectifiers 93 connected in a push-pull circuit to the ends of the windings 90 and 91 opposite said junction and also to the winding of relay 89 provide full wave rectified voltage for operating relay 89. The voltage from a secondary winding 94 on isolating transformer 57 is applied across the serial arrangement of a resistor 96 and a variable load adjusting rheostat 97 which permits adjustment of the length of the arc and the voltage across the arc. Inasmuch as the voltage drop due to the reactance of the system varies with load current, the load rheostat 97 permits the supply of a constant voltage to the control system through the entire range of load settings, and the resistor 96 limits the voltage variations resulting from adjusting rheostat 97 to the range over which the arc voltage changes when load current is varied over a desired range.

The voltage between the sliding contact of rheostat 97 and the end of resistor 96 remote therefrom is applied through peak current limiting resistors 98 and 99 across the full-wave rectifier 59. One terminal of the direct current side of rectifier 59 is grounded, and the opposite terminal is connected through conductor 101, a movable switch pole 113B, and a variable resistor 103 to the "lower" coil 52 of servovalve 38. The direct current signal from rectifier 54 together with the direct current signal from rectifier 59 form the input to control valve 38. The differential coils 51 and 52 of valve 38 receive the electrical signals from rectifiers 54 and 59 which are proportional to arc current and arc voltage respectively, and the differential current actuates armature 68 of actuating motor 50 against one of the nozzles 70 or 71 and creates a pressure differential in the control passages 73 and 74 which forces the piston valve 62 to a position wherein fluid under pressure from pump 41 flows through conduit 32 or 33 into the upper or lower end of the fluid servomotor cylinder 28, thereby actuating piston 29 to adjust the position of the electrodes 16 until the desired arcing conditions are obtained and the differential signal applied to coils 51 and 52 is a minimum. Since the impedances of the differential coils 51 and 52 are not identical, resistors 83 and 103 may be adjusted to establish equal resistances on both sides of the junction point of the coils 51 and 52.

If the charge caves in on electrode 16 during melt down, it is desirable that the electrode be withdrawn at maximum rate, whereas during the refining period it is desirable that the rates of raising and lowering the electrode be equal and relatively high. In accordance with the invention, means are provided to adjust the sensitivity of the electrically actuated valve means under predetermined conditions of the arc. The serial arrangement of a resistor 105, a variable "refine sensitivity" resistor 106 and the contacts 89A of emergency raise relay 89 are connected across conductors 81 and 101 in a shunt circuit to the serially arranged coils 51 and 52. The variable resistor 106 permits adjustment of the sensitivity of the electrically actuated valve means 38 in either direction of movement of electrode 16 when the movable blade of the "melt-refine" switch 108 is in the refine position, and it will be apparent that adjusting resistor 106 will vary the impedance in shunt to the differentially wound coils 51 and 52 and thus change the response of valve 38 to direct current signals from rectifiers 54 and 59.

Current surges during melt down of the charge may signal for rapid withdrawal of the electrode even though no cave in occurs and thus tend to cause the electrode to hunt for exact positioning, and means to minimize hunting during melt down include the serial arrangement of a variable "melt sensitivity" resistor 109 and a rectifier 110 connected between the melt stationary contact of the "melt-refine" switch 108 and the contacts 89A, thus being connected in parallel to "refine sensitivity" resistor 106 when the "melt-refine switch" 108 is actuated to melt position. The "melt sensitivity" resistor 109 is of considerably lower impedance than the "refine sensitivity" resistor 106, and "raise" signals from rectifier 54 due to current surges during melt down flow readily through rectifier 110, thus, in effect, shunting "refine sensitivity" resistor 106, decreasing the sensitivity of the differential coils 51 and 52 and lowering the response of the servovalve 38. Consequently the speed of raising the electrode 16 is lowered and the tendency of the electrode to hunt substantially overcome. Similarly, when a void in the charge 11 during melt down raises arc voltage and lowers arc current, the "lower" signals from rectifier 59 are blocked by rectifier 110 and the sensitivity of valve 38 is determined by "refine sensitivity" resistor 106, thereby assuring a relatively high differential voltage impressed on coils 51 and 52 and rapid movement of electrode 16 into the charge 11 results.

When the charge caves in against electrode 16, it is desired that the electrode be withdrawn at maximum speed. The junction of differential coils 51 annd 52 is connected to ground through a resistor 112 which is shunted by the normally open contacts 89B of emergency raise relay 89. When the voltage across the arc falls below a predetermined value due to a cave in of the charge 11 against the electrode 16, emergency raise relay 89 releases to open normally closed contacts 89A and to close contacts 89B. Opening of contacts 89A removes the sensitivity circuit impedances from shunt relation with the differential coils 51 and 52 and thus assures increased movement of valve piston 62 and rapid withdrawal of electrode 16. Closing of contacts 89B short circuits resistor 112 with the result that a still higher potential is applied to the "raise" coil 51, thereby causing the electrode 16 to be withdrawn at a still greater speed.

For manual control of the furnace, the "automatic-manual" switch 113, a switch 114 permitting selection of individual electrode operation or simultaneous adjustment for all electrodes, an individual electrode controller 115 for each electrode 16, and a single master controller 116 for all electrodes of the furnace are provided. Preferably the contacts of switches 114, 115, and 116 are of the make-before-break type although this feature is omitted from the drawing to facilitate understanding thereof. The "automatic-manual" switch 113 has three poles, two of which 113A and 113B in the auto position respectively connect conductor 81 to coil 51 through resistor 83 and conductor 101 to coil 52 through resistor 103. In the manual position of switch 113, pole 113A connects "raise" coil 51 through resistor 83 to conductor 118; pole 113B connects "lower" coil 52 through resistor 103 to conductor 119; and pole 113C connects the junction of differential coils 51 and 52 directly to ground. Full wave rectifier 120 provides a direct current source of suitable voltage for individually energizing the "raise" coil 51 on the "lower" coil 52, thereby actuating armature 58 and moving valve piston 62 to direct fluid under pressure from pump 41 into the upper or lower end of servomotor cylinder 28 and raising or lowering the electrode 16.

Manual control of a single electrode 16 may be accomplished by the individual electrode controller 115 for that electrode. Actuation of switch 114 to the "individual electrode" position connects conductors 118 and 119 to the raise and lower stationary contacts of individual electrode controller 115, and actuation of spring return individual electrode controller 115 to the raise position connects rectifier 120 to "raise" coil 51 through a suitable voltage dropping resistor 121, the movable contact of switch 115, the movable contact 114A of switch 114, conductor 118, the movable contact 113A of the "automatic-manual" switch, and resistor 83. A capacitor 122 to ground connected to conductor 118 in combination with resistor 121 introduces an RC time delay in the "manual raise" signal to present instantaneous response of valve 38, thereby assuring that electrode 16 starts and stops slowly. To lower the electrode 16, individual electrode controller 115 is similarly actuated to the lower position.

In the event that it is desired to raise or lower all of the electrodes manually as a group, switch 114 is actuated to the "master" position wherein conductor 118 is connected to the raise stationary contact of switch 116 through switch pole 114A and conductor 119 is connected to the lower stationary contact of switch 116 through switch blade 114B. If now spring return master switch 116 is actuated clockwise to the lower position, rectifier 120 is connected to "lower" coil 52 through voltage dropping resistor 123, the movable contact of master switch 116, switch blade 114B, conductor 119, switch blade 113B, and resistor 103. Similarly the "lower" coil 52 in the servovalves 38 of all of the electrodes are simultaneously energized and hydraulic fluid is directed to the upper end of each servomotor cylinder 28 to simultaneously lower the electrodes 16.

When the furnace transformer is initially energized and switch 113 is in the auto position, a potential proportional to the arc voltage will appear across rectifier 59 and "lower" coil 52 of the servovalve 38. The resultant movement of armature 63 hydraulically amplifies the input and actuates valve piston 62 in a direction to direct fluid under pressure from pump 41 into the upper end of servomotor cylinder 28. Electrode 16 lowers until the first electrode strikes the charge 11. The voltage across the arc and across rectifier 59 will drop to approximately zero, and springs 64 will return piston valve 62 to neutral position, thereby stopping the flow of fluid to servomotor 26 and stopping electrode 16.

When the second electrode strikes the charge 11, currents of short circuit magnitude flow through the electrodes and through the primaries of transformers 57. The arc voltage will drop to approximately twenty volts, and emergency raise relay 89 will release and close contacts 89B, thereby short circuiting resistor 112 with the result that approximately twenty volts will be impressed across "raise" coil 51 of servovalve 38. Opening of relay contacts 89A removes the "melt sensitivity" resistor 109 from its shunt relation with coils 51 and 52 with the result that electrode 16 will be raised at maximum speed until the voltage across the arc is sufficient to operate relay 89, which closes contacts 89A and opens contacts 89B to reduce the sensitivity of the electrically actuated valve 38 and reduce the speed of electrode withdrawal. When the differential coils 51 and 52 are equally energized, the electrode movement will cease until disturbed by changing arc conditions. The third electrode will strike the furnace charge 11, and the operation will be similar to that described for the second electrode except that the currents will not be of short circuit magnitude.

The charge within the furnace begins to melt and the electrodes must follow the receding charge in order to maintain the arc. As the charge recedes, the arc becomes longer and the arc resistance higher, thereby reducing current in the electrode and in the current transformer 55 and reducing the voltage signal impressed on "raise" coil 51. Simultaneously the arc voltage and the voltage signal from rectifier 59 impressed on "lower" coil 52 increase, and piston valve 62 assumes a position to direct fluid from pump 41 into the upper end of servomotor cylinder 28 to lower the electrode 16 until the arc is at the desired length. The length of the arc and the current flow in the electrode 16 may be varied within limits by adjustment of load rheostats 87 and 97.

Current surges during melt down which might tend to unnecessarily withdraw the electrode at a rapid rate and cause the electrode to hunt for exact positioning are by-passed by rectifier 110, thereby lowering the sensitivity of the electrically actuated valve 38 for "raise" signals while retaining high sensitivity and electrode speed for "lower" signals. If a charge cave-in occurs, emergency raise relay 89 will release and the electrode will be raised at maximum rate in a manner identical to that described for the electrode striking the charge at the start of furnace operation. If switch 108 is actuated to refine position, the sensitivity of valve 38 and speed of movement of electrode 16 will be high for both raising and lowering of the electrode.

During manual operation, the electrodes will accelerate and decelerate at the lower rate than in automatic operation because the RC time constant provided by capacitor 122 and resistor 121 prevents the application of full voltage instantaneously to the differential coils 51 and 52.

While only a particular embodiment of the invention has been illustrated and described, many modifications and variations thereof will be apparent to those skilled in the art, and it is intended in the appended claims to cover all such modifications and variations as fall within the true spirit and scope of the invention.

We claim:

1. A control system for an electric arc furnace provided with an electrode, comprising a fluid pressure-operated servomotor to produce the motive power for said electrode, electrically actuated valve means for controlling said servomotor and including a pair of differentially wound coils, means for energizing one of said coils in proportion to the current in said electrode and including a rectifier, means for energizing the other of said coils in proportion to the voltage across the arc of said electrode and including a rectifier, an impedance connected in shunt with said differentially wound coils, and a rectifier connected in shunt with a portion of said impedance and serving as a short circuit to said portion for signals applied to said differential coils in a direction to raise said electrode, whereby the tendency of said electrode to hunt for exact positioning due to current surges during melt down will be compensated for.

2. A control system for an electric arc furnace provided with an electrode, comprising fluid servomotor means coupled to the electrode for varying the electrode position, electrically actuated valve means for controlling said servomotor and including electric coil means differentially responsive to the current in said electrode and the voltage between the electrode and a charge for actuating said valve means, and means for varying the response of said valve means under predetermined arcing conditions including an impedance connected in shunt with said coil means and a rectifier connected in shunt with a portion of said impedance and serving as a short circuit to said portion for signals applied to said coil means in a direction to raise said electrode, whereby the tendency of said electrode to hunt for exact positioning due to current surges during melting will be compensated for.

3. A control system for an electric arc furnace having an electrode, comprising a fluid servomotor coupled to said electrode and adapted to position said electrode, valve means for controlling said servomotor including a pair of differentially wound coils having one end thereof commoned, an impedance connected to the junction of said coils, means including a rectifier for impressing a direct current signal proportional to the current in said electrode across the serial arrangement of one of said coils and said impedance, means including a rectifier for impressing a direct current signal proportional to the voltage of said arc across the serial arrangement of the other of said coils and said impedance, and a normally energized relay adapted to release when the voltage across the arc falls to a predetermined value and when released short circuiting said impedance, whereby the speed of raising said electrode is increased under emergency conditions.

4. A control system for an electric arc furnace having an electrode, comprising fluid servomotor means coupled to said electrode for varying the electrode position, means for deriving a first direct current voltage proportional to the current in said electrode, means for deriving a second direct current voltage proportional to the voltage between said electrode and the charge, valve means for controlling said servomotor and including a pair of differentially wound coils, means for applying said first voltage to one of said coils, means for applying said second voltage to the other of said coils, an impedance connected in a shunt circuit with said differentially wound coils, and means responsive to said second voltage for opening said shunt circuit when said electrode touches the charge thereby to increase the sensitivity of said valve means and the speed of raising said electrode.

5. A control system for an electric arc furnace having an electrode, comprising fluid servomotor means coupled to said electrode for varying the electrode position, means for producing a first direct current voltage proportional to the current in said electrode, means for producing a second direct current voltage proportional to the voltage between said electrode and the charge, valve means for controlling said servomotor and including a pair of differentially wound coils connected in series, a first impedance having one side connected to the junction of said coils, means for applying said first voltage across the serial arrangement of one of said coils and said first impedance and for applying said second voltage across the serial arrangement of said first impedance and the other of said coils, a second impedance connected in a shunt circuit with said serially connected coils, and means responsive to said second voltage for opening said shunt circuit and for short circuiting said first impedance when said electrode touches the charge thereby to increase the sensitivity of said valve means and the speed of raising said electrode.

6. A control system for an electric arc furnace having an electrode, comprising fluid servomotor means coupled to said electrode for varying the electrode position, means for deriving a first direct current voltage proportional to the current in said electrode, means for deriving a second direct current voltage proportional to the voltage between said electrode and the charge, valve means for controlling said servomotor and including a pair of differentially wound coils, means for applying said first voltage to one of said coils, means for applying said second voltage to the other of said coils, an impedance connected in a shunt circuit with said differentially wound coils, a rectifier connected in shunt with a portion of said impedance and serving as a short circuit to said portion for signals applied to said coils in a direction to raise said electrode, and means responsive to said second voltage for opening said shunt circuit when said electrode touches the charge.

7. In a control system for an electric arc melting furnace of the type having an electrode movable for varying the arcing gap between the electrode and a grounded charge, a fluid servomotor coupled to said electrode for varying the electrode position, means for producing a first direct current voltage proportional to the current in said electrode, means for producing a second direct current voltage proportional to the voltage between said electrode and the charge, valve means for controlling said servomotor and including a pair of differentially wound coils connected in series, a first impedance having one side connected to the junction of said coils, means for applying said first voltage across the serial arrangement of one of said coils and said first impedance and for applying said second voltage across the serial arrangement of said first impedance and the other of said coils, a second impedance connected in a shunt circuit with said serially connected coils, a rectifier connected in shunt with a portion of said second impedance and serving to short circuit said portion for signals applied to said coils in a direction to raise said electrode, and means responsive to said second voltage for opening said shunt circuit and for short circuiting said first impedance when said electrode touches the charge thereby to increase the sensitivity of said valve means and the speed of raising said electrode.

8. In a control circuit for an electric furnace of the type having an electrode movable for varying the arcing gap between the electrode and a grounded charge, a fluid servomotor coupled to the electrode and adapted to raise said electrode when fluid is supplied to one end of said servomotor and to lower said electrode when fluid is supplied to the other end of said servomotor; valve means for controlling the flow of fluid to opposite ends of said servomotor, said valve means having a hydraulic amplifier including a polarized solenoid energized from two differentially wound coils, means for deriving a first voltage proportional to the current in said electrode, means for deriving a second voltage proportional to the voltage between said electrode and said charge, and means for applying said first voltage to one of said coils and for applying said second voltage to the other of said coils.

9. In a control circuit for an electric arc furnace having an electrode movable for varying the arcing gap between the electrode and a charge, a fluid servomotor coupled to the electrode adapted to raise said electrode when fluid is supplied to one end of said servomotor and to lower said electrode when fluid is supplied to the other end of said servomotor, valve means including a body portion having a valving cylinder and a fluid-actuated valving piston reciprocable within said cylinder for controlling the supply of fluid to opposite ends of said servomotor, said valve means also being provided with a hydraulic amplifier and said body portion having control passages registering with said valving cylinder adjacent opposite ends thereof and said piston assuming a valving position in response to the differential flow of fluid through said control passages, said hydraulic amplifier including an actuating motor having coil means differentially responsive to current in said electrode and the voltage between the electrode and a charge and an armature operable in response to signals impressed on said coil means and selectively controlling the flow of fluid in said control passages.

10. A control system for an electric arc furnace having an electrode movable for varying the arcing gap between the electrode and a charge, a fluid servomotor coupled to the electrode for varying the position of the electrode, a source of fluid under pressure, valve means including a fluid-actuated reciprocable valving piston for controlling the supply of fluid under pressure to said servomotor and a hydraulic amplifier for controlling the position of said piston, said hydraulic amplifier including an actuating motor energized from coil means differentially responsive to the current on said electrode and the voltage between the electrode and a charge and an armature responsive to signals applied to said coil means and being adapted to selectively control the fluid for actuating said valving piston, and means for varying the response of said valve means under predetermined arcing conditions including an impedance connected in a shunt circuit to said coil means and means responsive to a predetermined voltage between the electrode and the charge for opening said shunt circuit.

11. A control system for an electric arc furnace having an electrode, comprising a fluid servomotor coupled to said electrode for varying the electrode position, electrically actuated valve means including a fluid-actuated valving piston for controlling said servomotor, said valve means also having a hydraulic amplifier including an actuating motor energized from coil means differentially responsive to the current in said electrode and the voltage between said electrode and a charge and an armature responsive to signals applied to said coil means and controlling the fluid for actuating said valving piston, and means for varying the response of said valve means under predetermined arcing conditions including an impedance in shunt with said coil means and a rectifier in shunt with a portion of said impedance and serving as a short circuit to said portion for signals applied to said coil means in a direction to raise said electrode, whereby the tendency of said electrode to hunt for exact position due to current surges during melting will be compensated for.

12. In a control system for an electric arc furnace provided with an electrode, fluid servomotor means coupled to the electrode for varying the electrode position, electrically actuated valve means including an electric coil for controlling said servomotor, a source of direct current voltage for energizing said coil to thereby control said valve means, a resistance, means including an electrode positioning manual switch for connecting said direct current voltage source in a series circuit with said coil and said resistance, and a capacitance connected to said circuit between said resistance and said coil and in shunt relationship with said coil, whereby upon operation of said manual switch to position said electrode the RC time delay of said resistance and capacitance will prevent the full voltage of said source from being instantaneously impressed across said coil and said servomotor will start and stop said electrode slowly.

13. A control system for an electric arc furnace provided with an electrode, comprising a fluid servomotor coupled to the electrode for varying the electrode position, a supply of fluid under pressure, conduit means interconnecting said supply and said servomotor, valve means interposed in said conduit means and including a body portion having a valving cylinder, a piston valve slidably mounted for reciprocation in said cylinder, resilient means normally urging said piston valve into a neutral position wherein said electrode is maintained stationary, said body portion also having control passages registering with said cylinder adjacent opposite ends thereof and said piston valve assuming a valving position in said cylinder in response to the differential flow of fluid through said passages and controlling the flow of fluid through said conduit means between said supply and said servomotor, said valve means also including a hydraulic amplifier for actuating said piston valve, said hydraulic amplifier including an armature for selectively controlling the flow of fluid under pressure through said control passages, a polarized solenoid energized from a pair of differentially wound coils for controlling said armature, means for deriving a first direct current voltage proportional to the current in said electrode and for applying said first voltage to one of said coils, and means for deriving a second direct current voltage proportional to the voltage across the arc and for applying said second voltage to the other of said coils.

14. A control system for an electric arc furnace provided with an electrode, comprising a fluid servomotor coupled to the electrode for varying the electrode position, a supply of fluid under pressure, conduit means interconnecting said supply and said servomotor, valve means interposed in said conduit means and including a body portion having a valving cylinder, a piston valve slidably mounted for reciprocation in said cylinder, resilient means normally urging said piston valve into a neutral position wherein said electrode is maintained stationary, said body portion also having control passages registering with said cylinder adjacent opposite ends thereof and said piston valve assuming a valving position in said cylinder in response to fluid delivered from said control passages against opposite ends of said piston valve and controlling the flow of fluid through said conduit means between said supply and said servomotor, said valve means also including a hydraulic amplifier for actuating said piston valve, said hydraulic amplifier including an armature for selectively controlling the flow of fluid under pressure into said control passages, a polarized solenoid energized from a pair of differentially wound coils for controlling said armature, means for deriving a first direct current voltage proportional to the current in said electrode and for applying said first voltage to one of said coils, and means for deriving a second direct current voltage proportional to the voltage across the arc and for applying said second voltage to the other of said coils.

15. In a control system for an electric arc furnace having an electrode movable for varying the arcing gap between the electrode and a charge, a fluid servomotor coupled to the electrode and including a cylinder and a piston movable within the cylinder to raise said electrode when fluid under pressure is introduced against one side of said piston and to lower said electrode when fluid under pressure is introduced against the opposite side of said piston, a pump, a highly sensitive, rapidly-responding four-way sliding valve means characterized by high output flow of fluid and including a body portion having an inlet passage connected to said pump, a return passage, delivery passages connected to opposite ends of said servomotor, and a valving cylinder, said valve means also including a valving piston reciprocable within said cylinder for selectively controlling the flow of fluid in said delivery passages, said valve means also including a force-multiplier the output of which controls the position of said valving piston within said valving cylinder and the input stage of which includes an actuating motor having a magnetic pole structure and coil means on said pole structure differentially responsive to current in said electrode and the voltage between the electrode and a charge.

16. In a control circuit for an electric arc furnace having an electrode movable for varying the arcing gap between the electrode and a charge, a fluid servomotor coupled to the electrode and including a cylinder and a piston movable within said cylinder to raise said electrode when fluid under pressure is introduced against one side of said piston and to lower said electrode when fluid under pressure is introduced against the opposite side of said piston, a pump, a four-way sliding valve means having an inlet passage connected to said pump, a drain passage, and delivery passages connected to opposite ends of said cylinder and including a body portion having a valving cylinder and a fluid-actuated valving piston reciprocable within said valving cylinder for controlling the flow of fluid in said delivery passages, said valve means being characterized by high dynamic response and high fluid delivery flow and including a hydraulic amplifier for controlling the position of said valving piston within said valving cylinder, the input stage to said hydraulic amplifier including an actuating motor having a magnetic pole structure and coil means on said pole structure differentially responsive to current in said electrode and the voltage between the electrode and a charge.

17. In a control system for an electric arc furnace having an electrode movable for varying the arcing gap between the electrode and a charge, a fluid servomotor coupled to the electrode and including a cylinder and a piston movable within said cylinder to raise said electrode when fluid under pressure is against one side of said piston and to lower said electrode when fluid under pressure is against the opposite side of said piston, a pump, a sliding valve means characterized by high output flow of fluid, high response, and high sensitivity including a body portion having a valving cylinder; delivery passages registering with said valving cylinder and connected to the opposite ends of said servomotor, and an inlet passage registering with said valving cylinder and connected to said pump; said valve means also including a fluid-actuated valving piston reciprocable within said cylinder and adapted to control the flow of fluid from said inlet passage into said delivery passages, said body portion including control passages registering with opposite ends of said valving cylinder and said valving piston assuming a position within said valving cylinder in accordance with the difference in pressure in said control passages, said valve means also including a hydraulic amplifier the output of which controls the differential pressure in said control passages and a torque motor having a polarized solenoid with a pair of coils one of which is responsive to the current in said electrode and the other of which is responsive to the voltage between said electrode and a charge, said torque motor also including an armature operative in response to the difference in signals applied to said coils for controlling the output of said hydraulic amplifier.

References Cited in the file of this patent

UNITED STATES PATENTS

| | | |
|---|---|---|
| 2,485,094 | Gunderson | Oct. 19, 1949 |
| 2,519,599 | Payne | Aug. 22, 1950 |
| 2,617,181 | Morey | Mar. 2, 1954 |